United States Patent [19]

Rumpf

[11] 4,171,782
[45] Oct. 23, 1979

[54] APPARATUS AND PROCESS FOR DEAD ZONE CONTROL IN SAFETY BELT RETRACTORS

[75] Inventor: Robert J. Rumpf, Grosse Pointe, Mich.

[73] Assignee: The Firestone Tire & Rubber Company, Akron, Ohio

[21] Appl. No.: 865,697

[22] Filed: Dec. 29, 1977

[51] Int. Cl.$^2$ ............... A62B 35/00; B65H 75/48
[52] U.S. Cl. .................................. 242/107.4 D
[58] Field of Search ............ 242/107.4 R, 107.4 E; 297/388; 280/744–747

[56] References Cited

U.S. PATENT DOCUMENTS

| 3,510,085 | 5/1970 | Stoffel | 242/107.4 B |
| 3,741,495 | 6/1973 | Takada | 242/107.4 D |
| 3,873,041 | 3/1975 | Rumpf et al. | 242/107.4 D X |
| 3,883,089 | 5/1975 | Close | 242/107.4 B |

Primary Examiner—Harvey C. Hornsby
Assistant Examiner—John M. Jillions
Attorney, Agent, or Firm—Miller, Morriss and Pappas

[57] ABSTRACT

A retractor and method for preventing premature movement of a lock pawl or bar toward locking engagement with a ratchet driven by the drum of the retractor structure and achieved by a torsion spring connected to and driven by the drum. The drum movement in both a retracting and protracting direction applies opposite biases to a pawl blocking element and the preselection of each bias zone being achieved on assembly of the spring to the retractor drum at a selected point in retraction and protraction.

6 Claims, 7 Drawing Figures

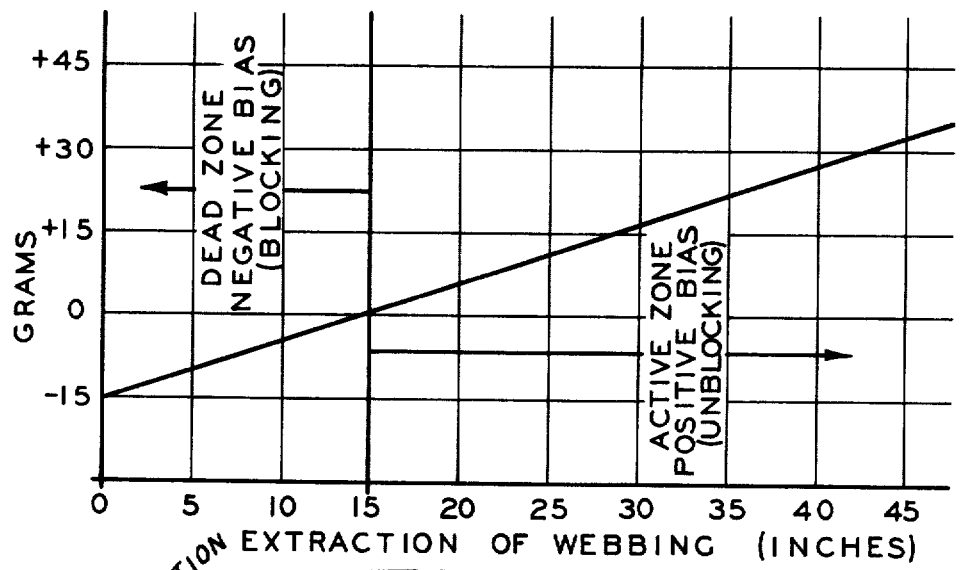
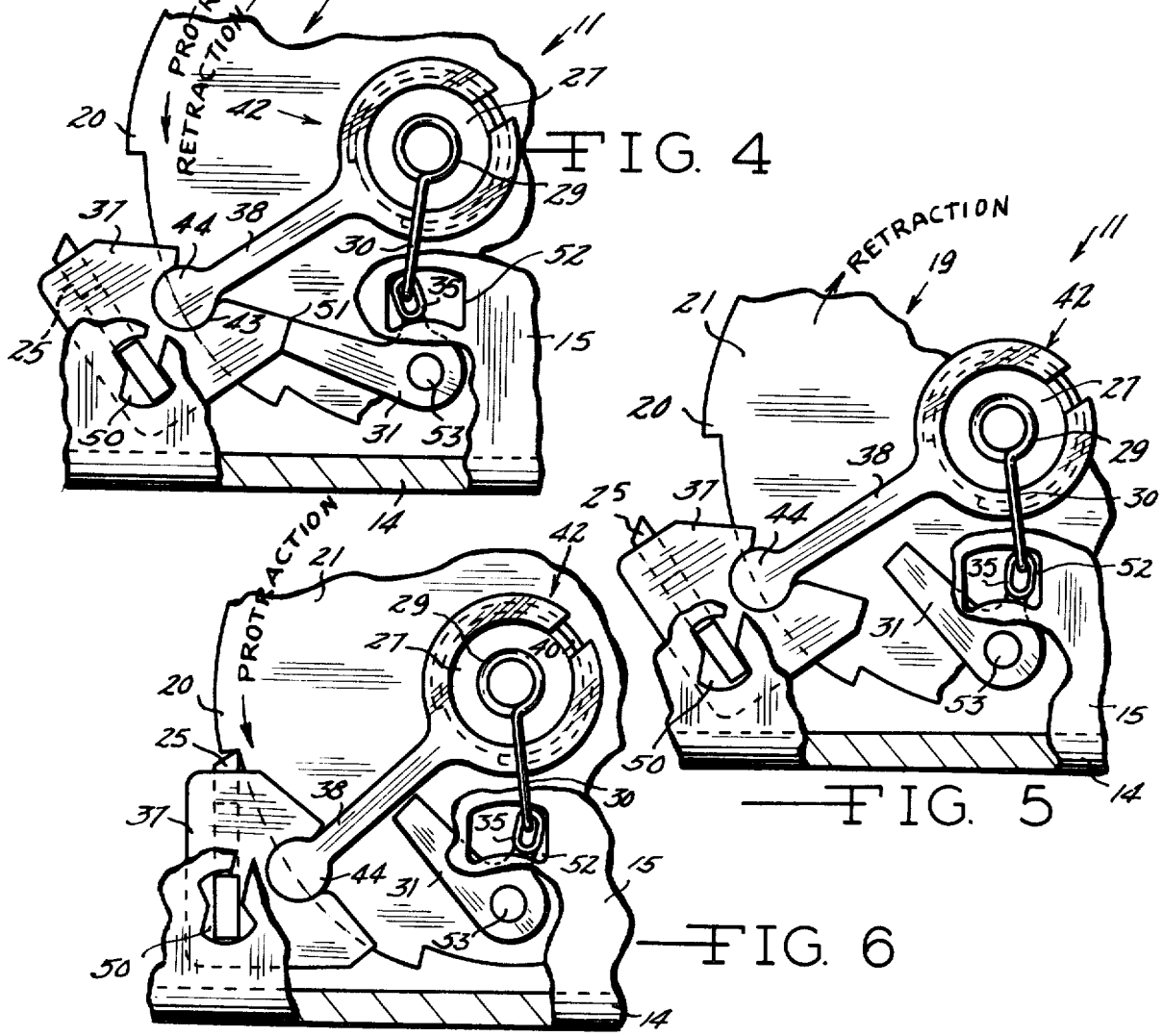
FIG. 3
FIG. 4
FIG. 5
FIG. 6

APPARATUS AND PROCESS FOR DEAD ZONE CONTROL IN SAFETY BELT RETRACTORS

The present invention is directed to a method and apparatus for selectively obstructing the activating of a pawl element in webbing retractors for safety belts in which a torsion spring driven by retracting and protracting rotating motion of the webbing storage drum selectively blocks the accessibility of a pawl element to a ratchet element moving with the drum until a no-load condition exists in the torsion spring. Then, the loading of the torsion spring reverse and a bias for freeing the pawl for subsequent access to the ratchet element is applied and locking is thereafter available in accord with requirements of the particular retractor device.

The present invention allows a designer to achieve any selected amount of "free pull" at assembly by selecting a "no-load" position for installation of the torsion spring between full retraction and full extension of the webbing. This type of sensor greatly simplifies the mechanical achievement of changing the attitude of a retractor structure.

The apparatus, in the environment of a spring driven rewind retractor having a pawl or pawl bar to lock the drum against further retraction at a prearranged condition or on the impulse of a sensed condition, is a simple torsion spring attached to the drum and driven by the rotation of the drum in one direction during withdrawal or protraction movement of the drum and in an opposite direction on retraction movement of the drum. The torsion spring attached at one end to the drum is attached at the other end to a pawl blocking element having limited rotational movement to block the pawl from lock access against a ratchet driven by the drum. Then, after selected protraction, when the drum is driven in the opposite sense as by momentary retraction, the energy stored in the torsion spring releases the pawl by moving the blocker and freeing the pawl for locking against the ratchet on any further protraction or by any force applied to the pawl urging it into lock engagement with the ratchet on the drum.

The process of the present invention is the preselection by assembly of the torsion spring at some selected point between full retraction and full extension or protraction of the webbing in relation to the drum so that the torsion spring is at a no-load condition at that point and so that further extension of webbing adds an increasing unblocking bias to the torsion spring and any retraction from the selected point applies an increasing bias toward reengagement of the blocking element against the pawl. Thus, the process is a process for selecting a predetermined amount of dead zone in safety belt retractors by locating a torsion spring at no-load at the selected point in withdrawal.

This vastly simplifies and avoids the requirement of webbing feelers (holding the pawl out of tooth engagement by the amount of webbing wound on the drum), counters (gear train arrangements which unblock the pawl at a selected number of rotations or angular displacement), and track devices (usually spiral tracks moving a cam or post to or from pawl blocking position). It will also be appreciated as the description proceeds that the present device and process are utilizable in automatic locker type retractors, in vehicle sensitive type inertial retractors, and in webbing sensitive inertial retractors wherever it is desired to achieve selected free-pull via a dead zone control prior to permitting the locking motion to be imparted to the pawl in the direction of the ratchet as by spring, positive motion of the drum in extension, or by clutch linkage operable when the blocking condition has been removed.

Such a structure and process results in substantial reduction in apparatus size and weight and permits great ease in the range selection of the zero bias point at assembly thus allowing, for example, a single retractor structure to accommodate an infinite number of installation requirements in automobiles by reason of body style, size or make at assembly.

IN THE PRIOR ART

The closest known work exemplifying various means to block the pawl to a predetermined point are seen in United States Letters Pat. No. 3,412,952 to Wohlert et al (feeler and cam); United States Letter Pat. No. 3,744,732 to John Edward Fowler (track and cam follower); United States Letters Pat. No. 3,711,037 to Hans Jakob (geared relationship); United States Letters Pat. No. 3,635,419 to William L. Pringle (spiral track and pin); United States Letters Pat. No. 3,667,698 to Robert C. Fisher (cam and gears); United States Letters Pat. No. 3,348,789 to Richard F. Hirsch (sensing from motor spring); and United States Letters Pat. No. 3,873,041 to Robert J. Rumpf et al (clutch actuation of pawl with feeler). None of the prior art devices known to applicant propose the use of a drum driven torsion spring applying a positive or negative torque to a pawl blocking element in accord with the extent of webbing withdrawal.

OBJECTS OF THE PRESENT INVENTION

The principal object of the new, useful and inventive device and process is the provision of a dead zone controller (pawl blocker and actuator) which is simple and which is selectively installable in retractors to selected zero position at assembly, as desired.

Another object is to provide such a dead zone controller which may be installed in a wide variety of types of retractors wherever selected blocking or unblocking bias against the pawl is desirable.

Still another object is to provide such a device in retractors so that the weight of the retractor is reduced.

Other objects, including economy of construction and assembly without sacrifice of precision, will be appreciated by those skilled in the art as the description proceeds.

GENERAL DESCRIPTION

In general, the retractors to which the present invention pertains comprise a frame, a storage drum for webbing journalled for rotation in the frame and the drum including one or more ratchet surfaces which rotate with the drum. The drum is operably connected to a motor which constantly applies a retracting bias to the drum and thus urging webbing onto the drum but permitting the overcoming of the bias by manual withdrawal or protraction of webbing therefrom. When the webbing is released, then the motor causes the webbing to be rewound on the drum to the extend of the capacity of the drum and motor. A pawl is also attached to the frame and is tiltable toward and away from locking engagement with the ratchet of the drum and when engaged against the ratchet locks the ratchet, and hence the drum, against any further protracting movement and prevents further withdrawal of webbing therefrom. The movement of the pawl element toward the ratchet may be urged by a pawl spring, by a positive movement or drive of the pawl by either manual or automatic means, or may be driven toward the ratchet by a condition sensing structure such as an inertially actuated clutch or a pendulum acting, for example, directly or indirectly on the pawl element. In some retractors the pawl is driven by a solenoid or piston in response to a sensed signal. In the present invention, such retractor structures are made to include a torsion spring actuator which is attached at one end to the drum so that the spring is rotated at that end by the drum. The other end of the spring is operably attached to a pivotal blocker, the blocker being pivotal on the frame. Thus, the blocker is urged to pivot in a direction of bias imparted by the torsion spring and the sense of the bias is in accord with whether the bias is imposed by retraction or protraction movement of the drum past the installation point or zero (no-load) point for the torsion spring at a point selected between full retraction and full protraction.

Operationally, the torsion spring actuator applies a bias to the blocker urging continued blocking or release of blocking depending upon which side of the zero point the movement of the drum takes. In retractors of the type described, there is a constant rewind bias so that the drum may travel in the rewind direction urged by the motor and unchecked by the pawl. During such retraction as the drum passes the zero (no-load) condition point, the bias on the blocker urges the reset blocking of the pawl in prevention of engagement of the pawl with the ratchet of the drum. This blocking bias continues until protraction of webbing as by manual withdrawal of webbing from the drum again reaches the zero (no-load) point. Beyond that zero point withdrawal can continue but the bias shifts on the blocker to an unblocking bias which cannot be satisfied until slight retraction of the webbing occurs as usually experienced at the point of buckling up or connecting the webbing by the user to accessory apparatus, for example. At that slight retraction, the blocker is freed from the pawl and the pawl may then engage the ratchet to block further withdrawal of webbing. Once freed of the blocker, the pawl is acted upon by whatever means is selected for signalling the locking of the particular retractor. As illustrated herein, the retractor includes a simple friction clutch on the drum and connected drivably to the pawl. As will be appreciated, when webbing is withdrawn from the drum, the clutch urges the pawl toward locking position. When webbing is being retracted, the clutch reverses the force applied to the pawl and tilts the pawl away from the ratchet. The blocker interrupts the movement of the pawl since the bias of the blocker is toward interruption as retraction proceeds past the zero point or no-load point of the torsion spring. After the blocker has fallen away from the pawl by the bias of the torsion spring by protraction of webbing past the no-load point and upon slight retraction, any further withdrawal of webbing will result in lock of the pawl against the ratchet, the pawl acted upon by a closing force as by the clutch and associated linkage. In other retractors, not shown, the pawl may have a separate spring urging it toward the ratchet when unobstructed by the blocker. The pawl may be acted upon by inertial forces urging it toward engagement with the ratchet on sensed conditions. The pawl may be otherwise urged to contact the ratchet by direct and indirect drive means which sense the acceleration of drum or webbing movement. In each of these the dead zone controller of the present invention is useful and inventive.

In THE DRAWINGS

FIG. 1 is a perspective view of a retractor in accord with the present invention and indicating the compactness of the retractor with the dead zone controller of the present invention.

FIG. 2 is an assembled perspective view of the invention indicated as embodied in the retractor shown in FIG. 1 and showing the frame removed to reveal the pawl bar, the torsion spring actuator connected through the shaft of the drum and to the blocker element in blocking engagement with the pawl and indicating a clutch attached to the drum and exerting a pawl locking or unlocking bias on the pawl bar in accord with the direction of rotation of the drum and the drum is shown including the ratchets on the flanges of the drum and rotatable therewith.

FIG. 3 is a chart showing the performance of the torsion spring actuator of the present invention installed at no-load condition at 15 inches of webbing withdrawal and applying a negative pawl blocking force in the dead zone to the selected extension of webbing and then a positive pawl unblocking force through any further extension of the webbing.

FIG. 4 is a partial cut-away elevational view with a portion of the frame and cover removed to show relation of parts under the blocking condition imposed by the negative bias on the torsion spring and showing a means of limiting the pivotal movement of the blocker element. Whatever force may be imposed by the movement of the drum and force by the clutch, the pawl element is obstructed by the blocker from engagement with the ratchet of the drum.

FIG. 5 is a partial cut-away elevation view as in FIG. 4 and shows the effect of the positive unblocking bias when a slight retraction of drum, as sensed by the clutch, imposes a releasing motion on the pawl sufficient to free the blocker under the force of the torsion spring.

FIG. 6 is a partial cut-away elevation view as in FIGS. 4 and 5 and indicating what sequentially follows after the condition shown in FIG. 5 when the pawl pivoting force acting upon the pawl (here by the clutch) engages the pawl element against the ratchet and locking the drum against any further withdrawal rotation of the drum.

Figure 7:
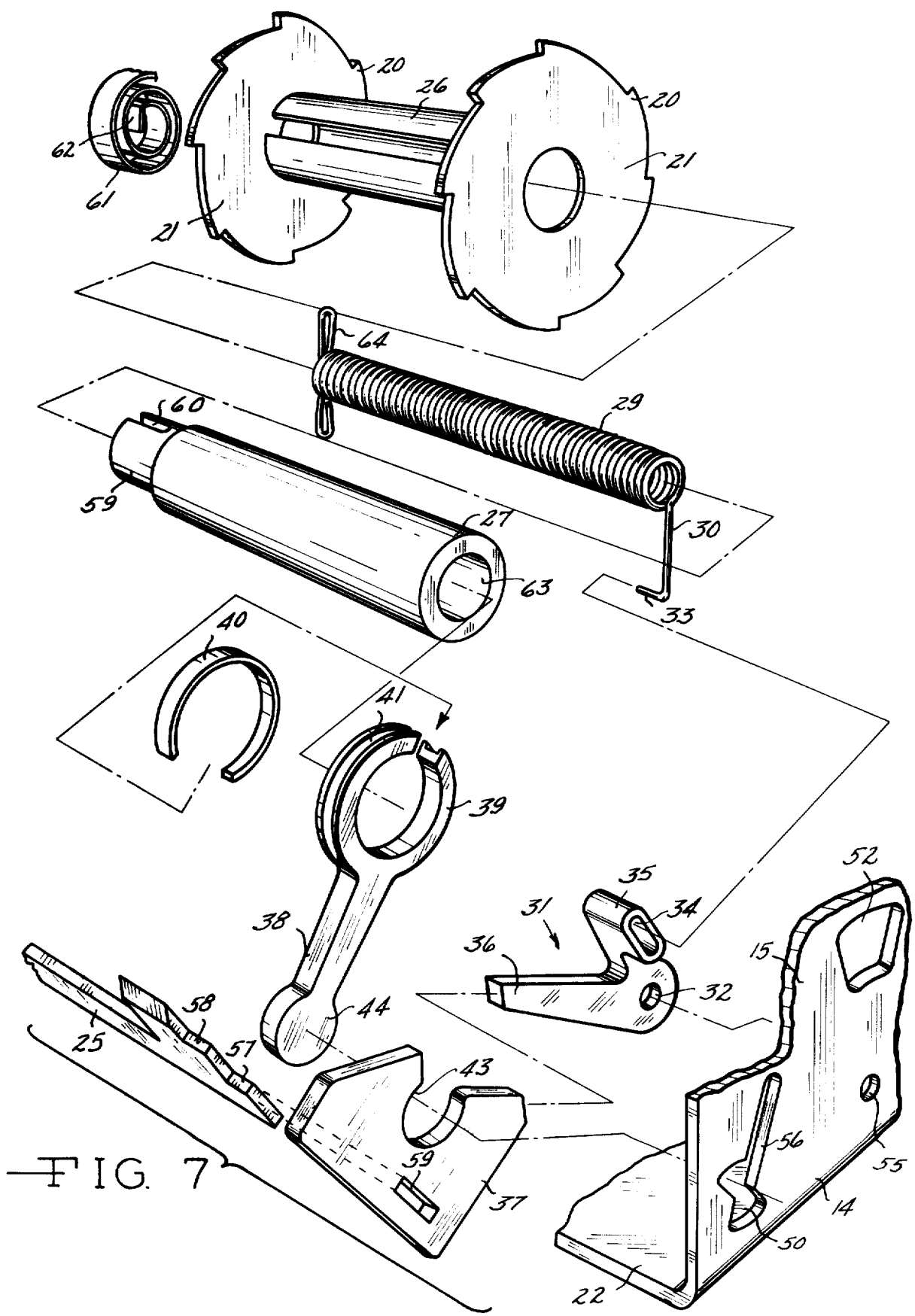

FIG. 7 is an exploded perspective view of the retractor construction in accord with the present invention and relating the retractor motor to the rewind of the drum connected to the hollow shaft and indicating an attachment means securing the torsion spring to the drum at one end and to the blocker at the other end. The pawl locking means is also shown with the clutch elements and the frame in pivotal support of the drum, blocker and pawl element and including rotational limiting means for pawl and blocker.

SPECIFIC DESCRIPTION

Figure 1:
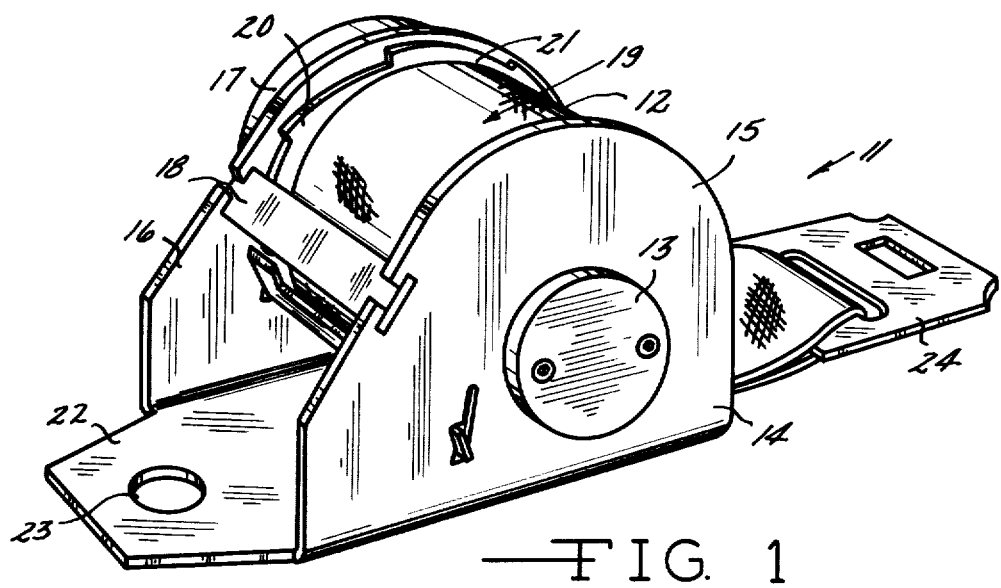

In FIG. 1 a retractor 11 for safety belt webbing 12 is shown and it is equipped with compact means to provide a new and efficient means of selected control of the dead zone in retractor 11. "Dead zone" as used herein has reference to the disabled condition of the pawl in automatic locking retractors which allows an unobstructed free-pull phase during which protraction and retraction may occur without the need for full retraction to achieve further protraction and to the second phase in which a slight retraction activates the locking system in the retractor against any further withdrawal. In general, the mechanism in control of the dead zone is located beneath the controller cover 13 secured to the frame 14 at the side 15 of the frame 14 opposite the side 16 of the frame 14. The side 16 supports the retractor spring motor in the motor housing 17. The spring motor is connected at one end to the frame 14 and at the other end to the shaft of the retractor "urging the retractor" to return the webbing 12 to the retractor 11. This winding bias on the webbing 12 is overcome by selected withdrawal of webbing 12 against the spring motor. The frame 14 is generally channel shaped with reinforcement straps 18, as desired, bridging between the two upstanding legs or sides 15 and 16 of the frame 14 to provide a stable support for the interval between the sides 15 and 16. The drum 19 on which the webbing 12 is wound includes toothed rotary ratchet surfaces 20 on the spaced-apart drum flanges 21. The web or floor 22 of the retractor frame 14 usually includes mounting means, here shown as an opening 23 permitting the retractor 11 to be bolted or otherwise affixed to a vehicle (not shown) in any selected position, so that the webbing 12 may be withdrawn from the retractor 11 and fastened, as by means of the tongue plate 24, to a buckle or fixture (not shown) which buckle or fastening element is usually a part of a safety belt system and the system is not a part of the present invention but is environmentally expressed for a complete operating understanding of the present invention. In the usual setting of seat belt restraints in vehicles, the webbing 12 is grasped at the tongue or buckle element 24, for example, is drawn across the body of the wearer, and is then fastened. During that extension or protraction the webbing 12 is withdrawn from the retractor 11 and the motion should be free and unimpeded (except for resistance of return spring motor) until the lock-up occurs. if the webbing 12 is released at any point the spring motor in housing 17 should restore the webbing to the drum 19 and ready for another cycle of use. After connection of the webbing 12 to a buckle such as a lap buckle (necessitating a pause in withdrawal), then any further withdrawal of webbing 12, as might occur in an emergency, should result in the pivotal pawl element or bar 25, in the butterfly slots 26 of the frame 14, engaging the ratchets 20 and stopping all further withdrawal. The closure of pawl 25 against the ratchets 20 is by reason of force applied to the pawl 25. When the lock condition ceases and the tongue 24 is released, then the retractor picks up the loose webbing 12. As will be seen, the present invention is directed to the apparatus and method for selectively blocking and unblocking the pawl bar 25 and so that the bias applied to blocking of the pawl element or lock assembly 25 reverses at a selected extension of webbing 12.

Figure 2:
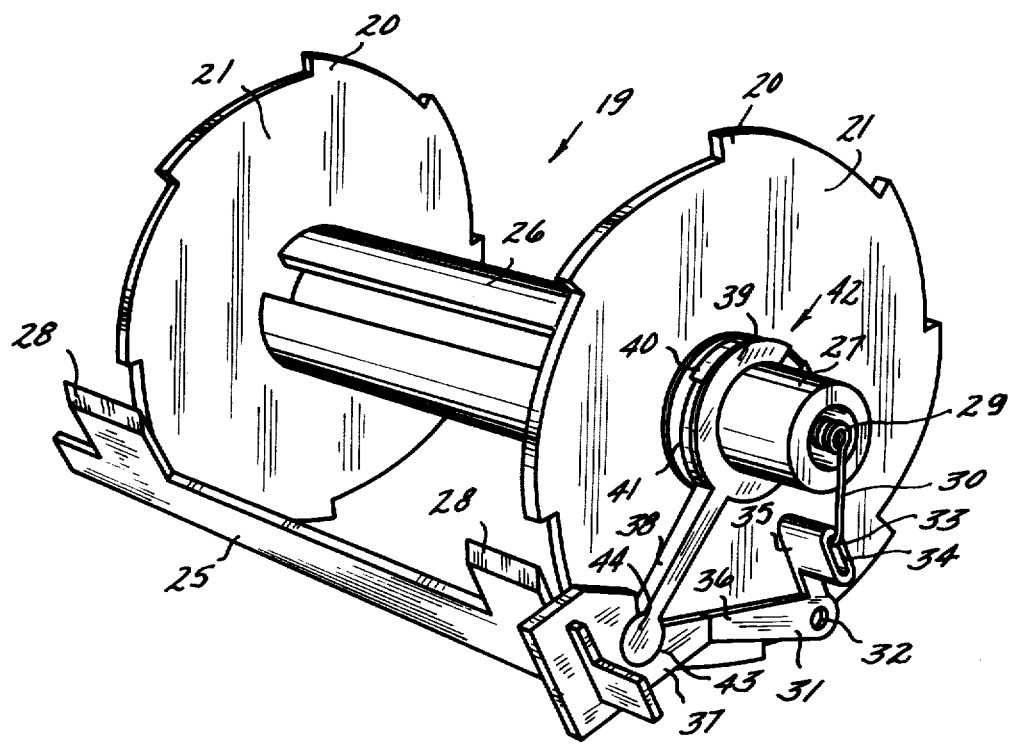

In FIG. 2 the construction obscured in FIG. 1 by the frame 14 is best appreciated. Webbing 12 has been removed from the drum 19 so as to show the spacer body or webbing carrier 26 supporting the spaced-apart flanges 21 which include the ratchets 20. This assembly is secured to a hollow shaft 27. The shaft 27 turns with the drum 19 and provides a journal means for the drum 19 supported by the frame 14. The pawl element or bar 25 has ratchet engaging faces 28 that move with the bar 25 toward and away from the ratchets 20. Retracting motion of the drum 19 (clockwise as shown) is not impeded by the pawl element 25 but protracting motion of the drum 19 (counterclockwise as shown) is directly prevented when the pawl bar 25 engages and locks the ratchets 20 against further rotation (shown in the FIG. 2 as counterclockwise).

A torsion spring or actuator 29 is secured to the drum 19 for rotation therewith and the convenient mode of attachment is shown through the hollow shaft 27. As will be seen, the torsion spring 29 is a helically wound spring which runs into the shaft 27 and is connected thereto at one end. The other end 30 of the torsion spring 29 extends radially outwardly from the shaft 27 to selected operating connection with a blocker element 31 shown in the form of a crank arm pivotal on a pin (not shown) through the pivot point located by the opening 32. Thus, the blocker 31 pivots at the axial center of the opening 32. The fastening of the torsion spring 29 to the blocker 31 is easily achieved by axially extending the spring 29 from the shaft 27 and inserting an inturned tip 33 of the spring extension portion 30 into a slot socket 34 raised outwardly from the blocker element 31 and defined by a sleeve 35. As will be seen, the sleeve 35 projects through an arcuate window in the frame 14 so that the spring extension 30 is actually outboard of the frame 14 and this moving connection is covered by the cover element 13 shown in FIG. 1. The purpose of the window is to allow restricted arcuate motion of the sleeve 35 and hence the blocker 31. The blocker 31 includes a projection 36 which engages a flange extension 37 of the pawl bar 25, and as shown in the FIG. 2, the blocker 31 prevents the pawl bar 25 from pivoting toward closure and lock against the ratchets 20. In the retractor shown, the agency through which a closing bias is applied to the pawl bar 25 is the clutch arm 38 fastened eccentrically to the extension 37 of the pawl bar 25 and the arm 38 has a clutch yoke end 39 frictionally over the shaft 27 and gripped supportably by the compression band 40 located in the circumferential groove 41 of the yoke end 39. This enhances the friction engagement of the clutch 42 to the shaft 27. Very light loading is applied to the clutch elements, blocker 31 and pawl extension 37 so that these may be constructed of relatively light and dimensionally stable plastic parts, such as injection and precision molded plastic material sold under the trademark, Delrin, and available from I. E. duPont de Nemours. To facilitate an operative connection between the clutch arm 38 and the pawl extension 37, an opening 43 is provided in the pawl extension 37 which registrably closes over an arcuate portion of the disc-like radially extending end 44 of the arm 38 in something over 180 degrees so as to be simply pressed into position on assembly and to be self-limiting in amount of arcuate relative rotation.

In the FIG. 3, the function of the torsion spring 29 can be best appreciated. In the example of the chart, the webbing 12 was withdrawn 15 inches from the drum and the torsion spring 29 was thereupon attached to the drum 19 at one end and to the blocker element 31 at the other end at "zero" or "no-load". As further protraction of the webbing 12 occurs after installation of the torsion spring 29, the positive bias loading of the spring 29 occurs building from 0 grams at 15 inches to about 30 grams at about 42 inches of withdrawal. This force is applied to the pawl blocker 31 urging the unblocking of the pawl 25. On retraction, the load diminishes and a reverse bias is applied as retraction passes the 15 inch point. In this "dead zone" the bias on the blocker 31 causes the blocker 31 to interfere with any movement of the pawl 25 toward the ratchets 20 so that, for the first 15 inches of webbing withdrawal, no locking of the webbing 12 can occur. As will be appreciated in the chart of FIG. 3, the "no-load" installation point can be variously selected for installation of the spring 29. The loading characteristics may also be varied by the selection of a particular torsion spring 29.

FIGS. 4, 5 and 6 assist in a complete operational understanding of the present invention. In the FIG. 4, the retractor 11 is shown in the fully retracted attitude. During retraction, the clutch 42 influenced by the retracting motion of the drum 19 in the clockwise direction, as shown, has tilted the pawl 25 in the journal of its butterfly slot 50 full away from engagement with the ratchets 20 and allowing the dead zone negative bias of the torsion spring 29 to block the pawl 25, as shown, through movement of the blocker 31. The shoulder blocking interphase at 51 is clearly appreciated and the window 52 in the side 15 of frame 14 limits the throw of the blocker 31 on pivot pin 53. From the retracted condition shown in FIG. 4, the protraction of webbing can commence with the blocker 31 preventing the pawl 25 from reaching the ratchets 20. As protraction continues past the no-load point (15 inches in FIG. 3), the condition of FIG. 4 still obtains but the bias upon the blocker element 31 is reversed so that the blocker 31 now wishes to pivot on the pin 53 away from the blocking engagement at interphase 51. The closing bias on the pawl 25, as applied by the clutch 42 acting on arm 38 and hence pawl extension 37, prevents the escape of the blocker 31 until the condition of FIG. 5 obtains. In FIG. 5, withdrawal of webbing has stopped at some point beyond the "no-load" or "zero" point on the torsion spring 29 and any slight retraction caused, for example, by the manipulative fastening of the webbing to a buckle is clutch imparted to the pawl 25 through its extension 37 and the arm 38 so that the blocker 31 springs free of the interphase at 51 (FIG. 4) to the extent permitted by the window slot 52 and acted upon by the unblocking or positive bias of the torsion spring 29. This clearly arms the pawl 25 for locking upon any further protraction of webbing from the retractor 11 and in FIG. 6 the consequence of further protraction is shown because the pawl 25 is unimpeded in its access to the ratchets 20 and in answer to the tilting motion achieved by the clutch 42 acting on the pawl 25. Retraction at the urging of the return spring motor can always occur when the webbing 12 is freed and the clutch 42 reverses with the rewind motion on the drum 19 fully through the "no-load" point. Thereupon, the negative or blocking bias is applied to the blocker 31 which repositions against the pawl 25 at the interphase 51 and the starting condition of FIG. 4 reobtains.

In the FIG. 7, the simplicity of the structure is best appreciated commencing with the channel-like frame 14 (fragmentally shown) to indicate the arcuate aperture or window slot 52 in the side 15 of the frame 14 and showing the opening 55 for the pivot pin 53 which provides pivotal support through the opening 32 in the blocker 31. The projection 36 of the blocker 31 which interphases selectively at 51 (FIGS. 4, 5, 6) is shown and the slot socket 34 in the sleeve extension 35 is best appreciated. The sleeve 35 extends through the window 52 in the frame 14 to limit pivotal movement of the blocker 31. Accordingly, the arc of the window 52 is related to the pivot openings 55 and 32 for the pin 53.

The communicating slot 56 in the frame 14 penetrates to the butterfly slot 50 for facilitating assembly since the wing portion 57 of the pawl 25 extends through slot 50 and access is achieved to that slot 50 by the wing 57 slipped along the communicating slot 56 on the side 15. On the side 16 a similar wing 57 is provided but no communicating slot 56 is needed and the plain butterfly slot 50 journals the pawl 25. The pawl plate extension 37 is pressed onto the pawl 25 at step 58 through the rectilinear opening 59. The arcuate opening 43 provided in the plate 37 receives the disc-like end 44 of the clutch arm 38. The bifurcated end of the arm 38 includes the clutch yoke which fits frictionally over the shaft 27 and the compression band 40 is snapped into the compression groove 41 to form the clutch structure 42 (FIG. 2). The shaft 27 is hollow, as shown, and includes a shouldered portion 59 which includes the axial slot 60. The drum 19 (FIG. 2) is made up of the two end flanges 21 which include the ratchets 20 and connected to the intermediate spacer body 26 which supports the webbing 12, and this subassembly is secured coaxially to the shaft 27 as by welding or keying so that the shaft 27 and drum 19 rotate together in journals provided by the frame 14. The spring motor 61 includes a center flat 62 insertable in the slot 60 of the shaft 27. The opposite end of the motor 61 is secured to the frame 14. At assembly, the torsion spring 29 is also attached to the shaft 27 through the hollow 62 of the shaft 27 and the T-head 64 of the helically wound torsion spring 29 is dropped into the axial slot 60 so as to be driven by the rotation of drum 19 and shaft 27. The torsion spring 29 includes a radial projection 30 which extends from the shaft 27 at the end opposite the slot 60. The extension 30 includes an inturned tip 33 which, as will be appreciated, is popped into the socket 34 of the blocker 31 to operably interconnect the blocker 31 with the torsion spring 29. Attachment occurs at "zero" or "no load" condition at a selected point of webbing withdrawal intermediate full retraction and full withdrawal. The tubular shaft 27 provides a clearance opening for the torsion spring 29 as indicated. The dead zone controller structure is compactly located and pawl extension elements 37, clutch arm 38, band 40 and blocker 31 carry such minimal loads as to permit their construction from light, economic, and non-corrosive durable plastic materials which are mass and precision produced as by injection molding.

By virtue of the present invention, the dead zone is easily established at assembly and the performance under testing is excellent.

Having thus described the invention, those skilled in the arts will readily perceive changes, improvements and modifications and adaptations to other retractors and such changes, improvements, modifications and adaptations are intended to be included herein, limited only by the scope of the hereinafter appended claims.

I claim:

1. A method for reversing a bias applicable to a lock blocking element at a selected point of webbing withdrawal and retraction in a safety belt retractor, including the steps of:

withdrawing webbing to a predetermined installing point which thereupon becomes said selected point;

attaching a torsion spring at one end to a part of said retractor, which said part rotates upon protraction and upon retraction; and attaching the other end of said torsion spring to a blocking element movable by the bias of said torsion spring to interfere with the locking of said retractor as protraction of said webbing from a fully retracted position proceeds to said selected point and said blocking element movably biased in a direction to free the locking function of said retractor when protraction of said webbing continues beyond said selected point.

2. A dead zone controller for safety belt retractors comprising:
- a rotating storage drum in a retractor;
- webbing stored on said drum;
- a torsion spring connected to said drum of said retractor;
- a blocker element connected to said torsion spring and said torsion spring under no-load bias at a selected point between full retraction of webbing on said retractor and full protraction of webbing from said retractor; and
- a lock assembly held disabled by said blocker element as said webbing is withdrawn from said drum until said torsion spring reaches the no-load bias condition and thereafter said blocker being urged by said torsion spring away from blocking engagement with said lock assembly as withdrawal of said webbing continues and until, by retraction, said torsion spring returns to said no-load bias condition.

3. In a retractor for safety belt webbing and said retractor having a webbing drum, a ratchet connected to said drum and a pawl engageable with said ratchet in prevention of withdrawal of webbing from the drum, the combination comprising:
- a torsion spring connected to said drum for rotation therewith between limits;
- pawl driving means connected to said pawl urging said pawl toward said ratchet during withdrawal of said webbing from said drum and urging said pawl away from engagement with said ratchet during retraction of said webbing from said drum; and
- a blocker element connected to said torsion spring and being selectively engageable and disengageable with said pawl under the urging of said torsion spring in opposite limits of rotations thereof for selectively preventing said pawl from engaging with said ratchet during rotation of said drum in one direction, and freeing said pawl for engagement with said ratchet under the urging of said pawl driving means in the other direction of drum rotation.

4. In a retractor for safety belt webbing and said retractor having a frame, a webbing drum rotatable in said frame, a ratchet connected to the drum and a pawl engageable with the ratchet in prevention of withdrawal of webbing from said drum, the combination comprising:
- a torsion spring connected to said drum;
- a movement aperture in said frame and defining the limits of movement of said spring, a limitedly movable end of said torsion spring in said aperture;
- a pawl blocker element movably connected to said limitedly movable end of said torsion spring, said blocker in one extreme of movement preventing said pawl from engaging said ratchet and in the other of said extremes of movement freeing said pawl to engage said ratchet; and
- means driven by said drum and connected to said pawl urging said pawl toward said ratchet during withdrawal of webbing from said drum and urging said pawl away from said ratchet during retraction of webbing by said drum.

5. A position sensing and bias reversing structure for selectively blocking the locking of safety belt retractors comprising:
- a rotating webbing storage drum including a motor urging retraction of webbing by said drum and the force of said motor being overcome by withdrawal of webbing from said drum;
- a lock structure in said retractor and acting to prevent protraction movement of webbing from said drum;
- a torsion spring attachable to said drum at a selected no-load point between full reaction and full protraction, and
- a lock prevention means connected to said torsion spring and blocking said lock structure on one side of said no-load point and unblocking said locking structure on the other side of said no-load point.

6. A method for sensing a reversal of condition for purposes of controlling the locking of a pawl against a ratchet in a drum retractor for safety belt webbing including the steps of:
- selecting a no-load point between full retraction and full protraction of said webbing from said drum;
- attaching a torsion spring to said drum at said no-load point and attaching said torsion spring to a control mechanism, said torsion spring having no bias at said no-load point, whereupon on further protraction of webbing from said drum a bias in one direction is applied to said torsion spring urging movement of said control mechanism in one direction and said bias in said one direction toward freeing said pawl for contact with said ratchet and remaining until upon retraction said torsion spring returns to said no-load point and thereafter further retraction applying a bias to said torsion spring in a direction opposite to said one direction and urging said control mechanism in a direction opposite to said one direction and against said pawl contacting said ratchet.

* * * * *

UNITED STATES PATENT OFFICE
CERTIFICATE OF CORRECTION

Patent No. 4,171,782      Dated 1979 October 23

Inventor(s) Robert J. Rumpf

It is certified that error appears in the above-identified patent and that said Letters Patent are hereby corrected as shown below:

Column 1, line 13, change "reverse" to read --- reverses ---

Column 2, line 17, change "Letter" to read --- Letters ---

Column 2, line 61, change "extend" to read --- extent ---

Column 5, line 38, change "if" to --- If ---

Column 10, line 25, change "reaction" to read --- retraction ---

Signed and Sealed this

Fifth Day of February 1980

[SEAL]

Attest:

SIDNEY A. DIAMOND

Attesting Officer     Commissioner of Patents and Trademarks